United States Patent
Moore

(10) Patent No.: US 10,682,748 B2
(45) Date of Patent: Jun. 16, 2020

(54) AUTO-LUBRICATION SYSTEM FOR A WORK TOOL

(71) Applicant: Caterpillar, Inc., Peoria, IL (US)

(72) Inventor: Cody Moore, Waco, TX (US)

(73) Assignee: Caterpillar Inc., Peoria, IL (US)

(*) Notice: Subject to any disclaimer, the term of this patent is extended or adjusted under 35 U.S.C. 154(b) by 325 days.

(21) Appl. No.: 15/846,501

(22) Filed: Dec. 19, 2017

(65) Prior Publication Data

US 2019/0184540 A1 Jun. 20, 2019

(51) Int. Cl.
| | |
|---|---|
| B25D 17/26 | (2006.01) |
| F16N 7/36 | (2006.01) |
| B25D 9/00 | (2006.01) |
| F16N 19/00 | (2006.01) |
| E02F 3/96 | (2006.01) |

(52) U.S. Cl.
CPC ............ B25D 17/26 (2013.01); B25D 9/00 (2013.01); B25D 17/265 (2013.01); F16N 7/36 (2013.01); *B25D 2217/0096* (2013.01); *B25D 2222/72* (2013.01); *B25D 2250/125* (2013.01); *B25D 2250/181* (2013.01); *B25D 2250/275* (2013.01); *B25D 2250/371* (2013.01); *E02F 3/966* (2013.01); *F16N 19/00* (2013.01); *F16N 2270/60* (2013.01)

(58) Field of Classification Search
CPC .... B25D 17/26; B25D 2250/371; B25D 9/00; B25D 2209/007; F16N 7/36; F16N 19/00
See application file for complete search history.

(56) References Cited

U.S. PATENT DOCUMENTS

| | | | | |
|---|---|---|---|---|
| 3,040,835 | A | * 6/1962 | Ahnert | ...................... F16N 7/34 184/55.2 |
| 3,822,001 | A | 7/1974 | Sides | |
| 4,972,925 | A | 11/1990 | Saretzky | |
| 5,060,761 | A | * 10/1991 | Arndt | ..................... B25D 17/26 184/29 |
| 5,549,031 | A | 8/1996 | Giordano | |
| 6,145,625 | A | * 11/2000 | Prokop | ................... F16N 11/10 184/105.2 |

(Continued)

FOREIGN PATENT DOCUMENTS

| | | |
|---|---|---|
| EP | 0118615 | 5/1988 |
| EP | 1313948 | 5/2003 |

(Continued)

*Primary Examiner* — Andrew M Tecco
(74) *Attorney, Agent, or Firm* — Calfee, Halter & Griswold LLP

(57) ABSTRACT

A lubrication system including a drive fluid chamber and a lubricant chamber. A first movable member is movable from a first position to a second position within the drive fluid chamber in response to drive fluid pressure acting on the first movable member. A second movable member is movable between a first position and a second position within the lubricant chamber and is operatively coupled to the first movable member. A biasing member is positioned to bias the first movable member toward the first position. A relief valve is associated with the first movable member and, when the relief valve in an open state, the drive fluid pressure acting on the first movable member is reduced such that the biasing member moves the first movable member to the first position within the drive fluid chamber.

15 Claims, 9 Drawing Sheets

(56) References Cited

U.S. PATENT DOCUMENTS

| | | | |
|---|---|---|---|
| 6,631,787 B2 | 10/2003 | Conley et al. | |
| 7,694,748 B2 | 4/2010 | Oksman | |
| 7,739,941 B2 | 6/2010 | Noble et al. | |
| 7,900,748 B2 * | 3/2011 | Bukhari | F16N 7/36 184/29 |
| 8,087,902 B2 | 1/2012 | Paluncic et al. | |
| 8,496,445 B2 | 7/2013 | Shulver et al. | |
| 8,596,418 B2 * | 12/2013 | Brendel | F16N 13/06 184/6.14 |
| 8,689,940 B2 * | 4/2014 | Jagdale | B25D 17/26 137/386 |
| 8,893,857 B2 | 11/2014 | Ifield | |
| 9,010,493 B2 | 4/2015 | Jagdale et al. | |
| 9,217,341 B2 * | 12/2015 | Hiner | F15B 13/0403 |
| 9,643,310 B2 * | 5/2017 | Moore | B25D 9/08 |
| 2006/0243528 A1 * | 11/2006 | Bukhari | F16N 7/36 184/27.1 |
| 2007/0187181 A1 * | 8/2007 | Brendel | F16N 13/06 184/6.14 |
| 2009/0308692 A1 * | 12/2009 | Sattelberger | B25D 17/26 184/29 |
| 2012/0043163 A1 * | 2/2012 | Jagdale | B25D 17/26 184/6.4 |
| 2015/0047928 A1 * | 2/2015 | Hiner | F15B 13/0403 184/6.14 |
| 2016/0046009 A1 * | 2/2016 | Moore | B25D 9/08 184/6.14 |
| 2017/0028541 A1 | 2/2017 | Moore | |

FOREIGN PATENT DOCUMENTS

| | | |
|---|---|---|
| EP | 1355104 | 10/2003 |
| JP | 2004082258 | 3/2004 |
| WO | 2011158167 | 12/2011 |

\* cited by examiner

AUTO-LUBRICATION SYSTEM FOR A WORK TOOL

TECHNICAL FIELD

The present disclosure relates generally to a lubrication system for a work tool, and more particularly, to an automatic lubrication system for a hydraulic or pneumatic hammer.

BACKGROUND

Demolition hammers are used on work sites to break up objects such as rocks, concrete, asphalt, frozen ground, or other hard objects. The hammers may be mounted to machines, such as backhoes and excavators, or may be hand-held. The hammers may be powered by a hydraulic or pneumatic pressure source. In operation, a high-pressure fluid drives a piston to strike a tool bit, which in turn, strikes rock, concrete, asphalt or other hard object to be broken up.

Lubrication systems are used to supply lubricant, such as grease, to bearing surfaces in the hammer to reduce friction between moving parts, such as between the tool bit and bushings that are used to align the tool bit. The lubrication system may be separate from the hammer, for example by being mounted on a carrier machine, or mounted to the hammer, i.e., an on-board system. Whether externally mounted or on-board, a lubricant supply is provided with the system. Conventional lubrication systems for demolition hammers can be complicated and include hydraulic motors that drive camshafts. Furthermore, operating demolition hammers without lubrication can result in significant damage to the hammer.

In the system of U.S. Pat. No. 9,643,310 B2 to Moore, a lubrication system includes a drive fluid valve member and a detune valve member. The drive fluid valve member is movable from a first to a second position in response to drive fluid pressure to reduce the volume of a variable volume lubricant charge chamber. The detune valve member is movable from a first to a second position in response to lubricant pressure within the lubricant charge chamber, and is adapted to permit fluid communication between inlet and bypass fluid passages in its the first position and to disengage the fluid connection in its second position.

SUMMARY

In one aspect, a lubrication system for a work tool powered by a drive fluid includes a housing defining a drive fluid chamber and a lubricant chamber, a first movable member positioned within the drive fluid chamber and movable from a first position to a second position within the drive fluid chamber in response to drive fluid pressure acting on the first movable member, a second movable member at least partly positioned within the lubricant chamber, the second movable member operatively coupled to the first movable member and movable between a first position and a second position within the lubricant chamber, a biasing member positioned within the drive fluid chamber, the biasing member biasing the first movable member toward the first position; and a relief valve associated with the first movable member, the relief valve having an open state and a closed state; wherein in the open state, the drive fluid pressure acting on the first movable member is reduced such that the biasing member moves the first movable member to the first position within the drive fluid chamber.

In another aspect, a method of supplying lubricant to a work tool powered by a drive fluid includes applying a first drive fluid pressure to a drive fluid chamber to move a movable member to pump lubricant from a lubricant chamber, and reducing the drive fluid pressure in the drive fluid chamber to move the movable member to draw lubricant into the lubricant chamber.

In another aspect, a demolition hammer powered by a drive fluid includes a housing, a piston disposed within the housing, a tool disposed within the housing to be acted upon by the piston, and a lubrication system. The lubrication system includes a housing defining a drive fluid chamber and a lubricant chamber; a first movable member positioned within the drive fluid chamber and movable from a first position to a second position within the drive fluid chamber in response to drive fluid pressure acting on the first movable member, a second movable member at least partly positioned within the lubricant chamber, the second movable member operatively coupled to the first movable member and movable between a first position and a second position within the lubricant chamber, a biasing member positioned within the drive fluid chamber, the biasing member biasing the first movable member toward the first position; and a relief valve associated with the first movable member, the relief valve having an open state and a closed state; wherein in the open state, the drive fluid pressure acting on the first movable member is reduced such that the biasing member moves the first movable member to the first position within the drive fluid chamber.

BRIEF DESCRIPTION OF THE DRAWINGS

Further features and advantages of the invention will become apparent from the description of embodiments using the accompanying drawings. In the drawings.

DETAILED DESCRIPTION

Figure 1:
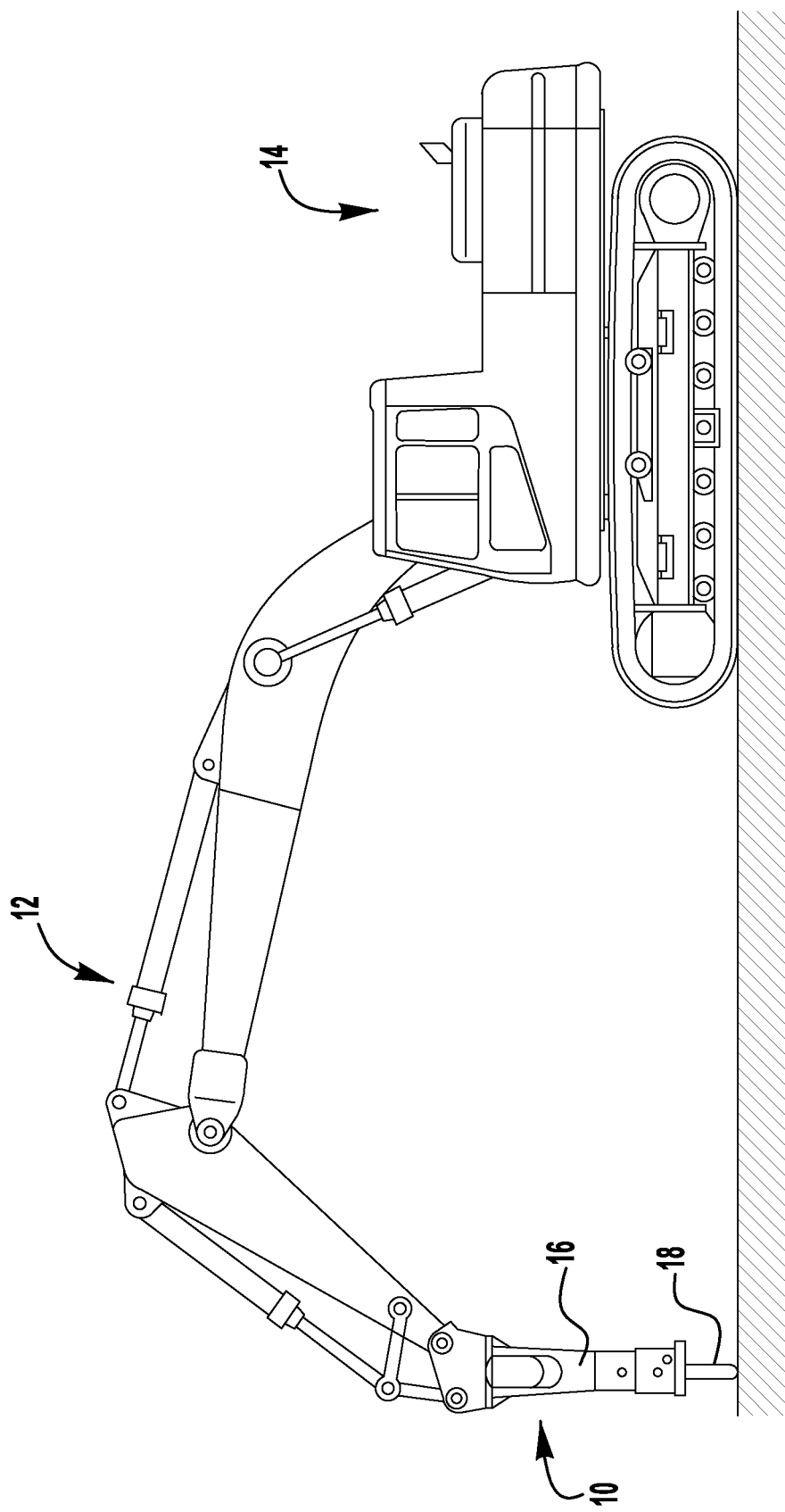
FIG. 1 is a side view of an embodiment of a work tool attached to an excavator.

Referring to FIG. 1, a work tool 10 powered by a drive fluid is attached to a boom 12 of an excavator 14. The work tool 10, however, may be connected to any suitable machine or base. In the illustrated embodiment, the work tool 10 is a hydraulic or pneumatic powered breaking tool, such as a demolition hammer. When attached to the excavator 14, as illustrated, the excavator's hydraulic system may be used to power the tool. Thus, the drive fluid may be hydraulic fluid. The present disclosure, however, is applicable to other hydraulic or pneumatic tools and to tools powered by other means. The work tool 10 includes a power cell 16 and a tool 18. The power cell 16 is configured to provide a breaking force via the tool 18 to an object, such as rocks, concrete, asphalt, frozen ground, or other hard objects.

While the arrangement is illustrated in connection with an excavator 14, the arrangement disclosed herein has universal applicability in various other types of machines as well. The term "machine" may refer to any machine that performs some type of operation associated with an industry such as mining, construction, farming, transportation, or any other industry known in the art. For example, the machine may be an alternate earth-moving machine, such as a wheel loader, backhoe, motor grader, material handler or the like. Moreover, one or more implements may be connected to the machine. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

Figure 2:
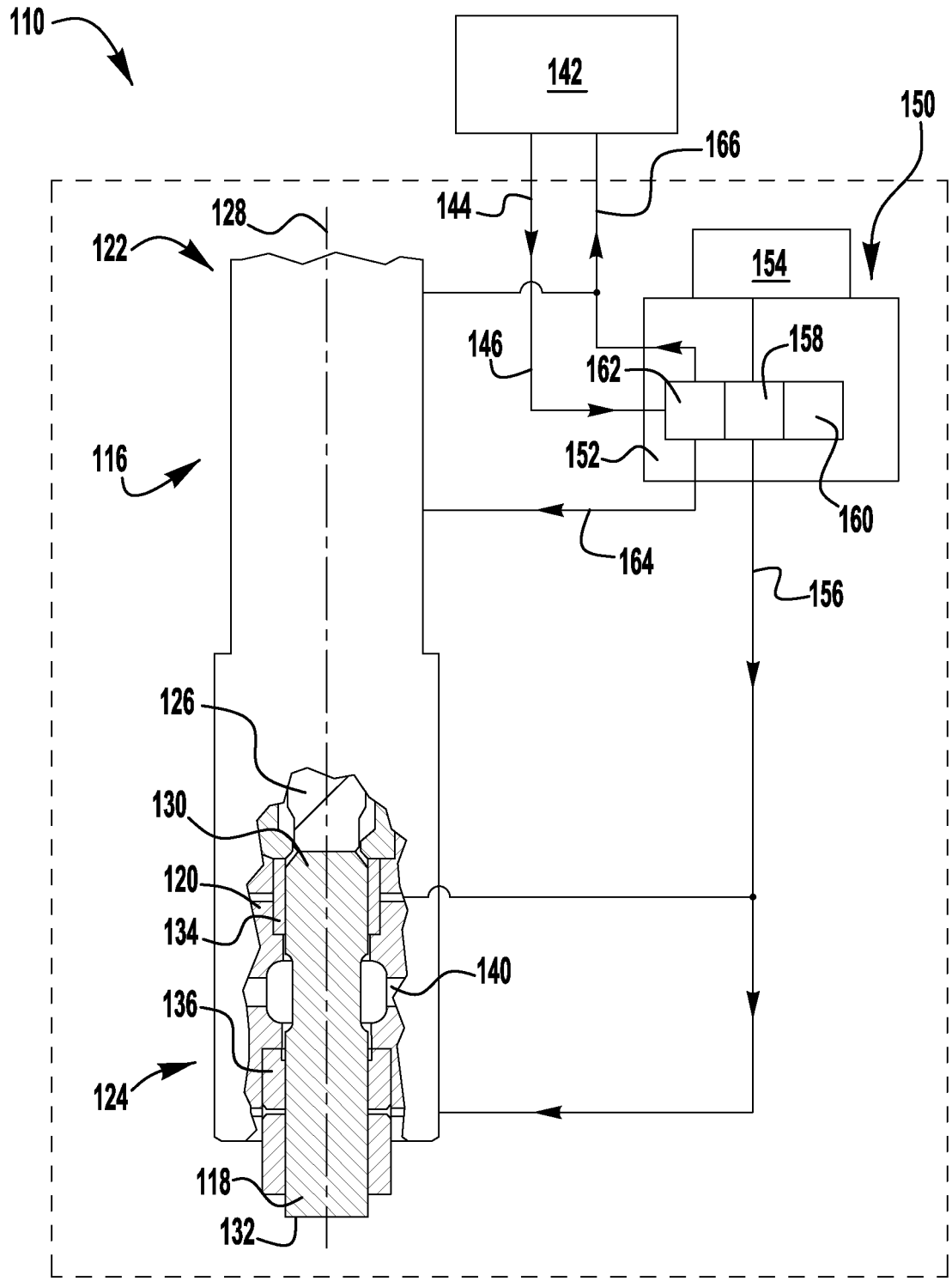
FIG. 2 is schematic and cross-sectional view of an embodiment of the work tool provided with an exemplary embodiment of a lubrication system.

FIG. 2 is a schematic illustration of an embodiment of a work tool powered by a drive fluid. The work tool is illustrated as a demolition hammer 110, such as a hydraulic hammer. The hammer 110 includes a power cell 116 and a tool 118. The power cell 116 includes a housing 120 having an upper end 122 and a lower end 124. The housing 120 may be formed as a single piece or may consist of a plurality of pieces and may be configured in a variety of ways. A piston 126 is disposed within the housing 120 and is movable along an axis 128. The tool 118 is also disposed within the housing 120 and is movable along the axis 128. The tool 118 includes a first end 130 and a second end 132. The first end 130 is configured and positioned in the housing 120 to be struck by the piston 126. The second end 132 of the tool 118 extends from the lower end 124 of the housing 120 to engage with objects to be broken.

The power cell 116 may also include an upper bushing 134 and a lower bushing 136. The upper bushing 134 and the lower bushing 136 are fixably held within the housing 120 by cross pins or other suitable means. The tool 118 is slidably received with the upper bushing 134 and the lower bushing 136. The tool 118 is retained within the housing 120 by retaining pins 140 or other suitable retention devices.

A drive fluid source 142, such as a drive fluid reservoir, may be associated with the hammer 110. The drive fluid source 142 may be configured to, on demand, deliver pressurized drive fluid to the hammer 110 for use in driving the piston 126. A pressure source, such as a fluid pump (not shown) or other suitable pressure source may be associated with the drive fluid source 142 to pressurize the drive fluid. Pressurized drive fluid from the drive fluid source 142 may be in fluid communication with a fluid inlet 144 of the hammer 110 via a drive fluid inlet passage 146.

A lubrication system 150 is associated with the hammer 110. In FIG. 2, the lubrication system 150 is depicted within a dashed box that includes the power cell 116, thus indicating that the lubrication system 150 and the power cell 116 are formed integrally as a unit with no external hoses or other components being required. In other embodiments, however, the lubrication system 150 may be externally mounted, for example by being mounted on a carrier machine or may be an on-board system that is mounted on the hammer and in fluid communication with the hammer via hoses or other conduits.

The lubrication system 150 includes a housing 152 in fluid communication with one or more lubricant reservoirs 154. Any suitable lubricant may be used, such as grease, for example. The lubrication system 150 is in fluid communication with the power cell 116 via a lubricant passage 156. The lubricant passage 156 communicates lubricant to each of the upper bushing 134 and the lower bushing 136. For ease of illustration, a portion of lubricant passage 156 is illustrated external to housing 120, though in some embodiments, the lubricant passage 156 may consist of internally formed conduits in the housing 152.

The lubrication system 150 may include one or more lubricant pumps 158 for directing lubricant to the power cell 116. The one or more lubricant pumps 158 may be configured in a variety of ways. The one or more lubricant pumps 158 may be configured to be driven by the drive fluid and may automatically pump lubricant when supplied with the drive fluid (e.g. during operation of the hammer 110). The one or more lubricant pumps 158 may include one or more lubricant supply pumps and one or more lubricant main pumps. The one or more lubricant main pumps may be configured and arranged to deliver lubricant to the power cell 116. The one or more lubricant supply pumps may be configured and arranged to provide lubricant to the one or more lubricant main pumps. The lubrication system 150 may be in fluid communication with the pressurized drive fluid from the drive fluid source 142 via the drive fluid inlet passage 146 or another drive fluid passage.

In one embodiment, one or more of the lubricant pumps 158 may be a fixed displacement pump in which a fixed amount of lubricant is delivered during each stroke or cycle. In other embodiments, one or more of the lubricant pumps 158 may be a variable displacement pump in which the stroke is varied during operating resulting in the amount of lubricant being delivered to vary during each stroke or cycle.

The lubrication system 150 may include a lubricant reserve reservoir 160 configured to store a quantity of lubricant separate from the one or more lubricant reservoirs 154. The lubricant reserve reservoir 160 may be configured in a variety of ways. Any configuration capable of storing a quantity of lubricant and capable of supplying the lubricant to the power cell 116 in the event that the one or more lubricant reservoirs 154 run out of lubricant may be used. In one exemplary embodiment, the lubricant reserve reservoir 160 is in fluid communication with the one or more lubricant pumps 158. During operation of the hammer 110, the one or more lubricant pumps 158 may fill the lubricant reserve reservoir 160 with lubricant. The lubricant reserve reservoir 160 may store the lubricant in a sufficient manner to serve as a back-up supply of lubricant for the power cell 116.

The lubrication system 150 may include a detune valve 162 that is configured to divert drive fluid from the power cell 116 should lubricant pressure drops below a specific pressure threshold (e.g., when the lubricant reservoirs run out of lubricant). The detune valve 162 may be configured in a variety of ways. Any configuration capable of diverting drive fluid away from the power cell 116 in the event that the lubricant pressure falls below a specific pressure threshold may be used. The detune valve 162 may be in fluid communication with the one or more lubricant pumps 158.

When the detune valve 162 is in a first state, drive fluid may be directed to the power cell 116 via a drive fluid hammer passage 164 in order to act upon the piston 126.

When the detune valve 162 is in a second state, all or a portion of the drive fluid flowing through the drive fluid inlet passage 146 may be diverted away from acting on the piston 126. For example, all or a portion of the fluid flowing through the drive fluid inlet passage 146 may be diverted back to the drive fluid source 142 via a drive fluid bypass passage 166. In this manner, when a low amount of lubricant within the one or more lubricant reservoirs 154 is indicated, the hammer 110 is disabled, derated or detuned (i.e., a reduced or limited amount of pressurized fluid being delivered to the piston).

Figure 3:
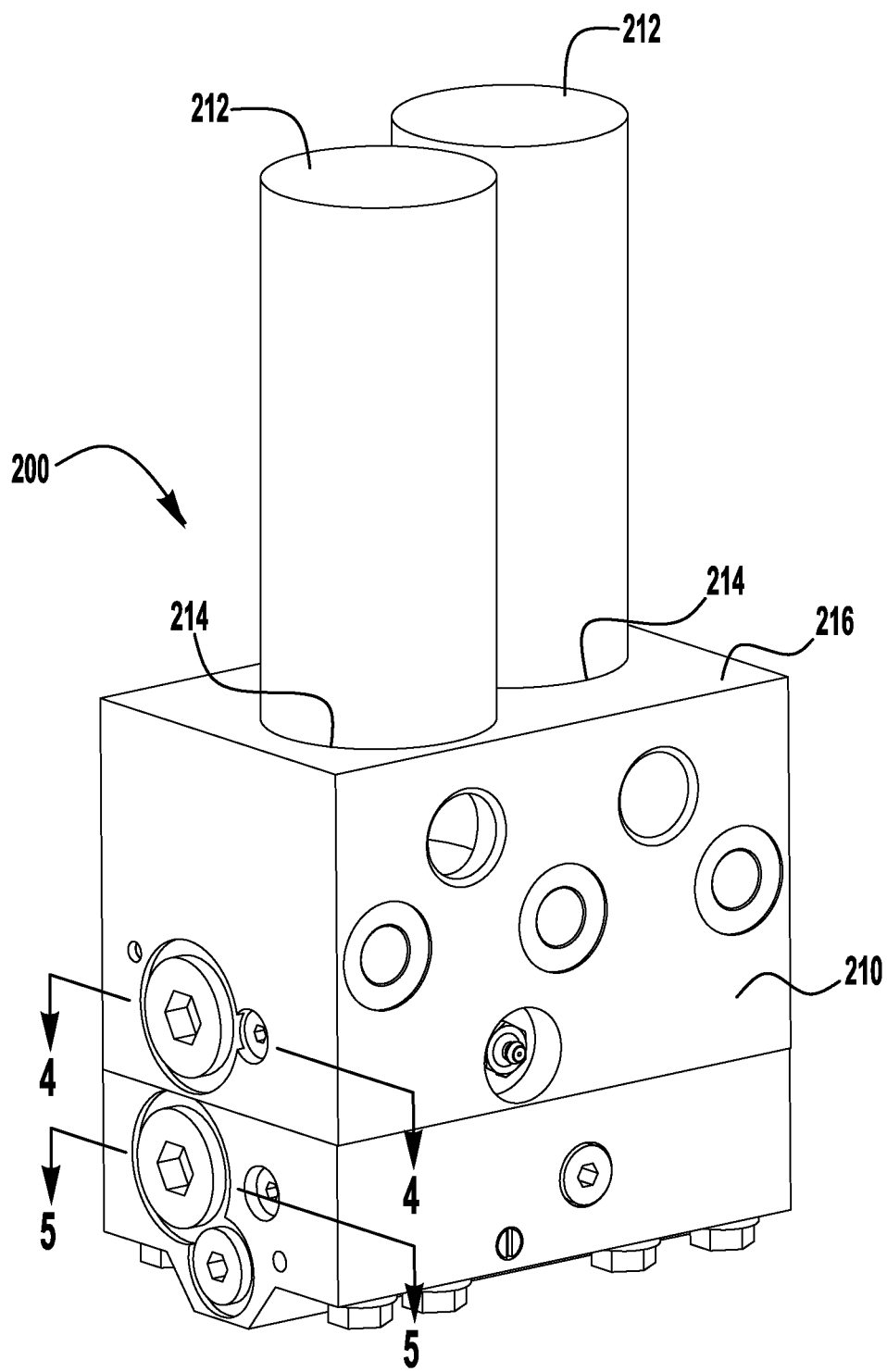
FIG. 3 is a perspective view of an exemplary embodiment of a lubrication system for a work tool.

FIG. 3 illustrates an exemplary embodiment of a lubrication system 200 for a work tool powered by a drive fluid. The lubrication system 200 may be configured in a variety of ways and include different functionality. In the illustrated embodiment, the lubrication system 200 includes a housing 210 and a pair of lubricant reservoirs 212. In other embodiments, the lubrication system 200 may include more or less than a pair of lubricant reservoirs 212. In the illustrated embodiment, the lubricant reservoirs 212 are grease cartridges, though other suitable lubricants can be used. The housing 210 includes a pair of recesses 214 in an upwardly facing surface 216 of the housing 210. Each of the pair of recesses 214 is configured to receive and retain one of the pair of lubricant reservoirs 212.

The housing 210 is configured to mount to a body portion of the hammer 110 to form an on-board or integrated lubrication system 200 with the hammer 110. In other embodiments, the lubrication system 200 can be separate from the hammer, for example by being mounted on a carrier machine.

Figure 4:
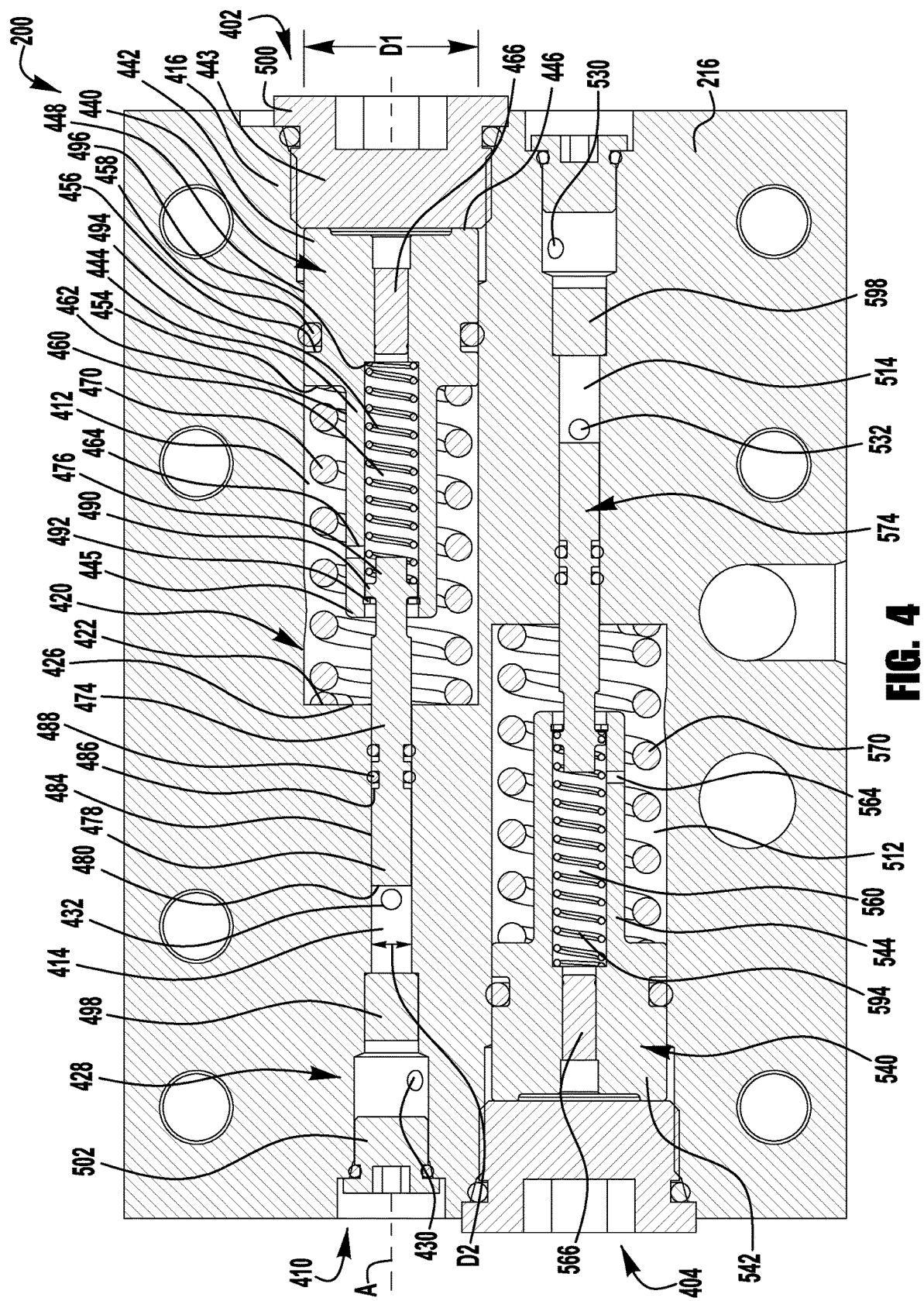
FIG. 4. is a cross-section view of the lubrication system of FIG. 3 taken along the 4-4 line showing a pair of lubricant pumps in a first state.

The lubrication system 200 may include one or more lubricant supply pumps configured to pull lubricant from the lubricant reservoirs 212. The lubricant supply pumps may be configured in a variety of ways. Referring to FIG. 4, in the illustrated embodiment, the lubrication system 200 includes a first lubricant supply pump 402 and a second lubricant supply pump 404. In other embodiments, however, the lubrication system 200 may include more or less than two lubricant supply pumps.

The first lubricant supply pump 402 is in fluid communication with one of the pair of lubricant reservoirs 212 and the second lubricant supply pump 404 is in fluid communication with the other of the pair of lubricant reservoirs 212. In the illustrated embodiment, the first lubricant supply pump 402 is substantially the same as the second lubricant supply pump 404; thus, the description of the first lubricant supply pump 402 applies equally to the second lubricant supply pump 404. In other embodiments, however, the first lubricant supply pump 402 may be different than the second lubricant supply pump 404.

Regarding the first lubricant supply pump 402, the housing 210 at least partially defines an internal channel 410 having a longitudinal axis A. The internal channel 410 includes a drive fluid chamber 412 and a lubricant chamber 414. The drive fluid chamber 412 has a first diameter D1 and the lubricant chamber 414 has a second diameter D2 that is smaller than the first diameter D1. In the illustrated embodiment, the lubricant chamber 414 is coaxial with the drive fluid chamber 412. In other embodiments, however, the drive fluid chamber 412 and a lubricant chamber 414 may not be coaxial.

The drive fluid chamber 412 has a first end 416 defining a drive fluid inlet 418 (FIG. 6) and a second end 420 defining a radially-extending shoulder 422. The second end 420 is open to the lubricant chamber 414 and the drive fluid inlet 418 (FIG. 6) is in fluid communication with the pressurized drive fluid from the drive fluid source 142. The drive fluid chamber 412 also includes a dump passage (not shown) fluidly connecting the drive fluid chamber 412, at a position proximal the second end 420, to the drive fluid source 142 for diverting drive fluid back to the drive fluid source 142.

The lubricant chamber 414 has a first end 426 open to the drive fluid chamber 412 and a second end 428 defining a lubricant outlet 430. The lubricant chamber 414 also has a lubricant inlet 432 positioned between the first end 426 and the second end 428. The lubricant inlet 432 is in fluid communication with one of the pair of lubricant reservoirs 212.

The first lubricant supply pump 402 may include a first movable member 440 positioned within the drive fluid chamber 412 and configured to be acted upon by the drive fluid. The first movable member 440 may be configured in a variety of ways, including various shapes, sizes, and materials. In the illustrated embodiment, the first movable member 440 includes a head portion 442 defining a first end 443 and a stem portion 444 extending longitudinally from the head portion 442 and defining a second end 445. The head portion 442 includes an end face 446 facing the first end 416 of the drive fluid chamber 412.

The head portion 442 includes an exterior surface 448 and a radially extending shoulder 454 adjacent the stem portion 444. The first lubricant pump 402 may include a sealing arrangement for preventing drive fluid from passing between the housing 210 and exterior surface 448 of the first movable member 440. The sealing arrangement may be configured in a variety of ways. Any suitable sealing arrangement may be used. For example, the sealing arrangement may be positioned in the housing 210 or positioned on the first movable member 440. In the illustrated embodiment, the exterior surface 448 includes a circumferential groove 456 and an annular seal 458 positioned within the groove 456.

The first movable member 440 may include a longitudinally extending passage 460. In the illustrated embodiment, the passage 460 extends longitudinally through the head portion 442 and into the stem portion 444 and is open at both ends 443, 445 of the first movable member 440. In other embodiments, however, the first movable member 440 may not include a passage 460 extending longitudinally within the first movable member 440 or may include a longitudinally extending passage 460 that does not extend all the way through the stem portion 444. The stem portion 444 includes an exterior surface 462 and may include a cross bore 464 extending from the exterior surface 462 to the passage 460.

The first lubricant supply pump 402 may include a reversing valve 466. The reversing valve 466 may be a pressure-actuated relief valve. The reversing valve 466 may be configured to open and relieve pressure acting on the end face 446 of the first movable member 440 when a first pressure threshold is reached and close when pressure acting on the end face 446 is below a second pressure threshold, which may be the same or different than the first pressure threshold. The reversing valve 466 may be configured in a variety of ways and located in a variety of locations within the lubrication system 200. Any configuration and location that allows the reversing valve 466 to relieve pressure acting on the end face 446 of the first movable member 440 when a specific threshold is reached and close when pressure acting on the end face 446 is below a pressure threshold may be used. The reversing valve 466 can be any suitable valve type, such as for example, a poppet valve. In the illustrated embodiment, the reversing valve 466 is positioned within the passage 460 in the head portion 442 of the first movable member 440. When the reversing valve is open, drive fluid may flow into the passage 460 and when the reversing valve 466 is closed, drive fluid is preventing from flowing into the passage.

In one exemplary embodiment, the ratio of opening pressure to closing pressure for the reversing valve 466 is in the range of about 3:1 to about 5:1, or about 4:1. In one exemplary embodiment the reversing valve is configured to open at a pressure in the range of about 1100 psi to about 1300 psi, or about 1200 psi. In other embodiment, however, the reversing valve 466 may be configured to open at a pressure of less than about 1100 psi or greater than about 1300 psi. In one exemplary embodiment, the reversing valve 466 is configured to close at a pressure in the range of about 250 psi to about 350 psi or about 300 psi. In other embodiments, however, the reversing valve 466 may be configured to open at a pressure of less than about 250 psi or greater than about 350 psi.

In the illustrated embodiment, a biasing member 470 may be positioned to bias the first movable member 440 toward the first end 416 of the drive fluid chamber 412. The biasing member 470 may be configured and positioned in any suitable manner. In the illustrated embodiment, the biasing member 470 is a coil spring positioned between the radially extending shoulder 454 on the first movable member 440 and the radially extending shoulder 422 at the second end 420 of the drive fluid chamber 412.

The first lubricant supply pump 402 may include a second movable member 474. The second movable member 474 may be configured to move within the lubricant chamber 414 to pump lubricant out of the lubricant chamber 414. The second movable member 474 may be configured in a variety of ways, such as for example, different shapes, sizes, dimensions and materials used. Any configuration capable of moving within the lubricant chamber 414 to pump lubricant out of the lubricant chamber 414 may be used. For example, movement of the second movable member 474 may change the volume within the lubricant chamber 414 and force lubricant out of the lubricant chamber 414.

In the illustrated embodiment, the second movable member 474 is a generally elongated member having a first end 476 configured to couple to the first movable member 440 and a second end 478 that extends into the lubricant chamber 414 through the first end 426 of the lubricant chamber 414. The second end 478 includes an end face 480.

The lubrication system 200 may include a sealing arrangement for preventing lubricant in the lubricant chamber 414 from entering the drive fluid chamber 412. The sealing arrangement may be configured in a variety of ways. For example, the sealing arrangement may be positioned in the housing 210 or on the second movable member 474. In the illustrated embodiment, the second movable member 474 has an exterior surface 484 having a pair of circumferential grooves 486 and a pair of annular seals 488. Each of the pair of annular seals 488 is disposed in one of the pair of circumferential grooves 486.

The first end 476 of the second movable member 474 may be configured to couple to the first movable member 440 in any suitable manner. For example, in one exemplary embodiment, the second movable member 474 may be fixably attached to the second end 445 of the first movable member 440 such that the first movable member 440 and the second movable member 474 move together. The second movable member 474 may be fixable attached to first movable member 440 is any suitable manner, such as a threaded connection, welded, formed integrally with the first movable member 440, or otherwise fixably attached.

In the illustrated embodiment, the second movable member 474 is attached to the first movable member 440 such that the second movable member 474 may move axially relative to the first movable member 440. The first end 476 of the second movable member 474 may extend into the passage 460 in the stem portion 444 of the first movable member 440 such that the first end 476 can move axially within the passage 460.

The first end 476 of the second movable member 474 may be configured to be retained within the passage 460. For example, in the illustrated embodiment, the first end 476 of the second movable member 474 includes an annular flange 490 having an outer diameter that is slightly less than the inner diameter of the passage 460. The passage 460 may include a stop 492 near the second end 445 of the first movable member 440. The stop 492 may be any structure, such as an integral shoulder, snap ring, C-clip, or other suitable structure, that engages the annular flange 490 to prevent the first end 476 of the second movable member 474 from exiting the passage 460.

A biasing member 494 may be positioned within the passage 460 to bias the first end 476 of the second movable member 474 toward the second end 445 of the first movable member 440. The biasing member 494 may be configured in any suitable manner. In the illustrated embodiment, the biasing member 494 is a coil spring that is positioned between the annular flange 490 on the first end 476 of the second movable member 474 and a radially extending shoulder 496 near or within the head portion 442.

The first lubricant supply pump 402 may include a check valve 498 between the lubricant inlet 432 and the second end 428 of the lubricant chamber 414. The check valve 498 may be configured to prevent the flow of lubricant into the lubricant chamber 414 from the second end 428. The check valve 498 may be any suitable check valve and may have any suitable cracking pressure. In one embodiment, the check valve has a cracking pressure of in the range of about 60 psi to about 100 psi, or about 80 psi.

The internal channel 410 may be closed at either end. In the illustrated embodiment, the internal channel 410 includes a first plug 500 at the first end 416 of the drive fluid chamber 412 and a second plug 502 at the second end 428 of the lubricant chamber 414. The drive fluid inlet 418 of the drive fluid chamber 412 is positioned between the first plug 500 and the first movable valve member 440 and the lubricant outlet 430 of the lubricant chamber 414 is positioned between the check valve 498 and the second plug 502.

As previously indicated, the first lubricant supply pump 402 is substantially the same as the second lubricant supply pump 404. Thus, in the illustrated embodiment, the second lubricant supply pump 404 includes a first movable member 540 positioned in a drive fluid chamber 512 and a second movable member 574 positioned, at least partially, in a lubricant chamber 514 having a lubricant inlet 532 and a lubricant outlet 530. The first movable member 540 includes a head portion 542 and a stem portion 544. A passage 560 extends through the head portion 542 and into the stem portion 544 and a reversing valve 566 is positioned within the passage 560 in the head portion 542.

The stem portion 544 includes a cross bore 564 communicating the passage 560 to the drive fluid chamber 512 downstream of the head portion 542. A biasing member 570 may be positioned in the drive fluid chamber 512 to bias the first movable member 540 away from the lubricant chamber 514.

The second movable member 574 is attached to the first movable member 540 such that the second movable member 574 may move axially relative to the first movable member 540. A biasing member 594 may be positioned within the passage 560 to bias the second movable member 574 toward the lubricant chamber 514. A check valve 598 may be positioned between the lubricant inlet 532 and the lubricant outlet 530.

Figure 5:
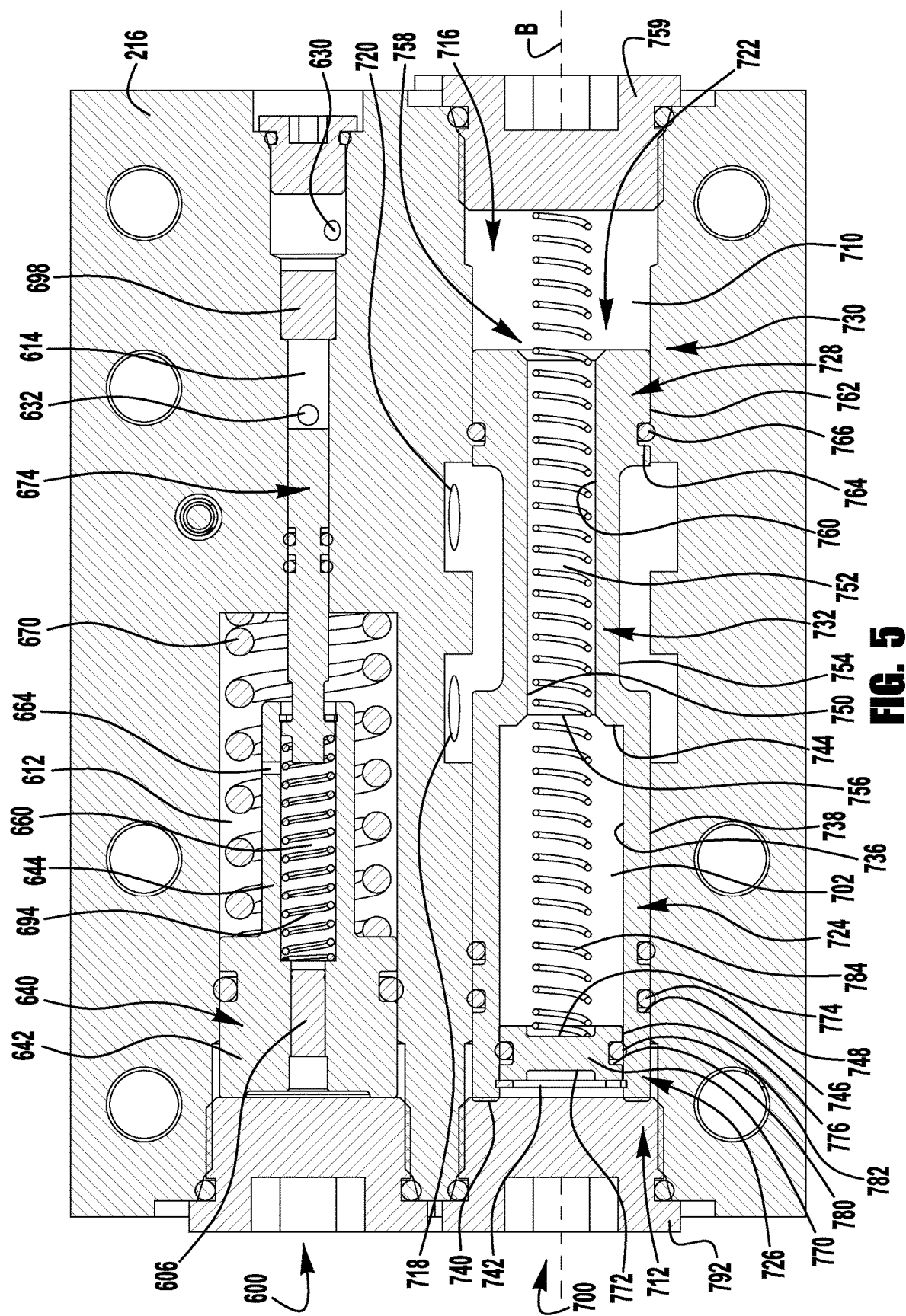
FIG. 5 is a cross-section view of the lubrication system of FIG. 3 taken along the 5-5 line showing a lubricant pump and a detune assembly in a first state.

Referring to FIG. 5, the lubrication system 200 may include one or more lubricant main pumps 600 configured to receive lubricant from the one or more lubricant supply pumps 402, 404 and deliver the lubricant under pressure to the power cell 116. In the illustrated embodiment, the lubrication system 200 include one lubricant main pump 600. In other embodiment, however, the lubrication system 200 may include more than one lubricant main pump 600.

The lubricant main pump 600 may be configured in a variety of ways. In the illustrated embodiment, the lubricant main pump 600 is substantially the same as the first and second lubricant supply pumps 402, 404. Thus, in the illustrated embodiment, the lubricant main pump 600 includes a first movable member 640 positioned in a drive fluid chamber 612 and a second movable member 674 positioned, at least partially, in a lubricant chamber 614 having a lubricant inlet 632 and a lubricant outlet 630. The first movable member 640 includes a head portion 642 and a stem portion 644. A passage 660 extends through the head portion 642 and into the stem portion 644 and a reversing valve 666 is positioned within the passage 660 in the head portion 642.

The stem portion 644 includes a cross bore 664 communicating the passage 660 to the drive fluid chamber 612 downstream of the head portion 642. A biasing member 670 may be positioned in the drive fluid chamber 612 to bias the first movable member 640 away from the lubricant chamber 614.

The second movable member 674 is attached to the first movable member 640 such that the second movable member 674 may move axially relative to the first movable member 640. A biasing member 694 may be positioned within the passage 660 to bias the second movable member 674 toward the lubricant chamber 614. A check valve 698 may be positioned between the lubricant inlet 632 and the lubricant outlet 630. The check valve 698 may be any suitable check valve and may have any suitable cracking pressure. In one embodiment, the check valve 698 has a cracking pressure of in the range of about 270 psi to about 330 psi, or about 300 psi.

The lubrication system 200 may include a detune assembly 700 that is configured to divert all or a portion of the drive fluid away from acting on the piston 126 in the power cell 116 when a low amount of lubricant within the lubricant reservoir 154 is indicated. The detune assembly 700 may be configured in a variety of way. Any configuration capable of diverting all or a portion of the drive fluid away from acting on the piston 126 when a low amount of lubricant within the lubricant reservoir 154 is indicated may be used.

The lubrication system 200 may include a lubricant reserve reservoir 702 configured to store a quantity of lubricant separate from the one or more lubricant reservoirs 212. The lubricant reserve reservoir 702 may be configured in a variety of ways. Any configuration capable of storing a quantity of lubricant and capable of supplying the lubricant to the power cell 116 in the event that the one or more lubricant reservoirs 212 run out of lubricant may be used.

In the illustrated embodiment, the detune assembly 700 and the lubricant reserve reservoir 702 are integrated into a single assembly. In other embodiments, however, the detune assembly 700 and the lubricant reserve reservoir 702 may be independent of each other and may be positioned at different locations within the lubrication system 200.

In the illustrated embodiment, the housing 210 at least partially defines an internal channel 710 having a longitudinal axis B. The internal channel 710 has a first end 712 defining a lubricant inlet 714 (FIG. 8) and a second end 716 opposite the first end 712.

The internal channel 710 is fluidly connected to a dump passage 718 at a location between the first end 712 and the second end 716. The dump passage 718 is fluidly connected to the drive fluid source 142. The internal channel 710 is also fluidly connected to a pressurized drive fluid passage 720 at a location between the dump passage 718 and the second end 716.

In the illustrated embodiment, a movable member 722 is positioned within the internal channel 710 and configured to be acted upon by pressurized lubricant from the one or more lubricant supply pumps 402, 404 or the lubricant main pump 600. The movable member 722 may be configured in a variety of ways, including various shapes, sizes, and materials. In the illustrated embodiment, the movable member 722 is generally elongated and includes a first portion 724 defining a first end 726, a second portion 728 defining a second end 730, and a third portion 732 connecting the first portion 726 and the second portion 728.

The first end 726 includes an inner surface 736 defining the lubricant reserve reservoir 702 and an outer surface 738 generally parallel to the inner surface 736. The lubricant reserve reservoir 702 is open at the first end 726. The first end 726 includes a peripheral shoulder 740 facing the first end 712 of the internal channel 710. The peripheral shoulder 740 defines an inlet 742 to the lubricant reserve reservoir 702. The lubricant reserve reservoir 702 includes an inner shoulder 744 opposite the inlet 742.

A sealing arrangement may be provided for preventing lubricant and drive fluid from passing between the housing 210 and the outer surface 738. The sealing arrangement may be configured in a variety of ways. Any suitable sealing arrangement may be used. For example, the sealing arrangement may be positioned in the housing 210 or positioned on the movable member 722. In the illustrated embodiment, the outer surface 738 includes a pair of circumferential grooves 746 and a pair of annular seals 748. Each of the annular seals 748 is disposed in one of the pair of circumferential grooves 746.

The third portion 732 extends from the first portion 724 toward the second end 730 and includes an inner surface 750 at least partially defining an inner chamber 752 and an outer surface 754 generally parallel to the inner surface 750. The inner chamber 752 has a first end 756 that is open to the lubricant reserve reservoir 702 and a second end 758 that extends through the second portion 728 and is open at the second end 730. A first plug 759 may be positioned at the second end 730 adjacent the second portion 728.

In the illustrated embodiment, the third portion 732 has a reduced diameter as compared to the first portion 724. The reduced diameter facilitates connecting the pressurized drive fluid passage 720 to the dump passage 718 when lubricant pressure falls below a pressure threshold, as will be described in detail below. In other embodiments, the third portion 732 may have the same diameter as the first portion 724 but include other structure to facilitate connecting the pressurized drive fluid passage 720 to the dump passage 718, such as for example, a groove or recess in the outer surface 754 or an internal passage.

The second portion 728 includes an inner surface 760 at least partially defining the inner chamber 752 and an outer surface 762 generally parallel to the inner surface 760. In the illustrated embodiment, the second portion 728 has a similar diameter to the first portion 724.

A sealing arrangement may be provided for preventing drive fluid from passing between the housing 210 and the outer surface 762. The sealing arrangement may be configured in a variety of ways. Any suitable sealing arrangement may be used. For example, the sealing arrangement may be positioned in the housing 210 or positioned on the movable member 722. In the illustrated embodiment, the outer surface 762 includes a circumferential groove 764 and a an annular seal 766 disposed in the circumferential groove 764.

The movable member 722 includes a follower 770 positioned within the lubricant reserve reservoir 702. The follower 770 is configured to move axially within the lubricant reserve reservoir 702 in response to lubricant pressure. The follower 770 may be configured in a variety of ways. Any suitable configuration that allows the follower to move within the lubricant reserve reservoir 702 in response to lubricant pressure may be used.

In the illustrated embodiment, the follower 770 is generally disc-shaped having a first face 772 facing the inlet 742 to the lubricant reserve reservoir 702, a second face 774 opposite the first face 772, and a peripheral edge 776 extending between the first face 772 and the second face 774. The peripheral edge 776 may include an annular groove 780 and an annular seal 782, such as an o-ring, may be received in the groove 780 to prevent lubricant from flowing between the peripheral edge 776 and the inner surface 736 of the first end 726.

A biasing member 784 may be positioned within the inner chamber 752 to bias the follower 770 toward the inlet 742 of the lubricant reserve reservoir 702. Any suitable biasing member may be used. In the illustrated embodiment, the biasing member 784 is a coil spring positioned between the second face 774 of the follower 770 and the first plug 759.

The lubricant reserve reservoir 702 may include a stop 790 near the inlet 742. The stop 790 may be any structure, such as an integral shoulder, snap ring, C-clip, or other suitable structure, that engages the follower 770 to prevent the follower 770 from exiting the lubricant reserve reservoir 702 via the inlet 742. A second plug 792 may be positioned at the first end 712 of the channel 710.

INDUSTRIAL APPLICABILITY

The lubrication system 200 may be associated with a work tool, such as for example, a demolition hammer 110. The lubrication system 200 may be integrated with the work tool and driven by the same drive fluid, such as hydraulic fluid or compressed air, used to operate the work tool. Referring to FIG. 4, in operation, the first lubricant supply pump 402 may be fluidly coupled to pressurized drive fluid from the drive fluid source 142 via the drive fluid inlet 418. The first lubricant supply pump 402 may also be fluidly coupled to one of the lubricant reservoirs 212 via the lubricant inlet 432. Likewise, the second lubricant supply pump 404 may be fluidly coupled to pressurized drive fluid from the drive fluid source 142. The second lubricant supply pump 404 may also be fluidly coupled to one of the lubricant reservoirs 212 via the lubricant inlet 532. The hammer 110 may include internal and external passages (not shown) for directing lubricant and drive fluid to the lubricant supply pumps 402, 404, the lubricant main pump 600, the detune assembly 700, and the lubricant reserve reservoir 702.

In the exemplary embodiment, the first lubricant supply pump 402 and the second lubricant supply pump 404 operate at the same time and in parallel. In other embodiments, however, the first lubricant supply pump 402 and the second lubricant supply pump 404 may not operate at the same time. Instead, while one lubricant supply pump is operating, the other lubricant supply pump may be idle.

In describing the operation of the lubrication system 200, the operation of the first lubricant supply pump 402 will be described. The second lubricant supply pump 402 operates substantially the same, thus the description of the operation of the first lubricant supply pump 402 applies equally to the second lubricant supply pump 404. FIG. 4 illustrates the first lubricant supply pump 402 in a first state. In the first state, the first movable member 440 is in a first position within the drive fluid chamber 412. In the first position, the first movable member 440 is biased by the biasing member 470 to a retracted position adjacent the first plug 500.

In the first state, the second movable member 474 is in a first position within the lubricant chamber 414. In the first position, the second movable member 474 is retracted such that the lubricant inlet 432 is between the face of the second movable member 474 and the lubricant outlet 430. Furthermore, the second movable member 474 is in a first position within the passage 460. In the first position within the passage 460, the second movable member 474 is biased to an extended position relative to the first movable member 440.

Typically, when the second movable member 474 is in the first position within the lubricant chamber 414, the lubricant chamber 414 is full of lubricant due to the suction caused by the retracting movement of the second movable member 474 when moved to the first position.

Figure 6:
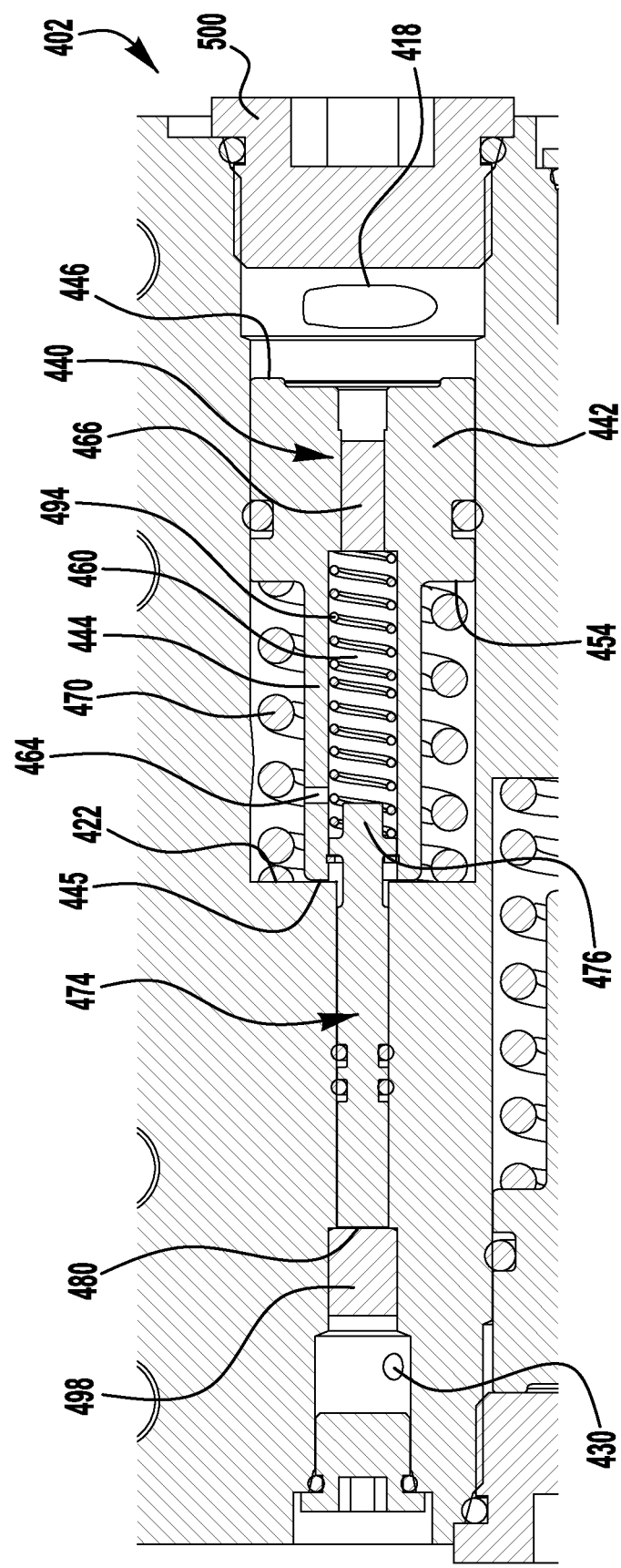
FIG. 6 is a partial cross-section view of the lubrication system of FIG. 3 taken along the 4-4 line showing a lubricant pump in a second state.
Figure 7:
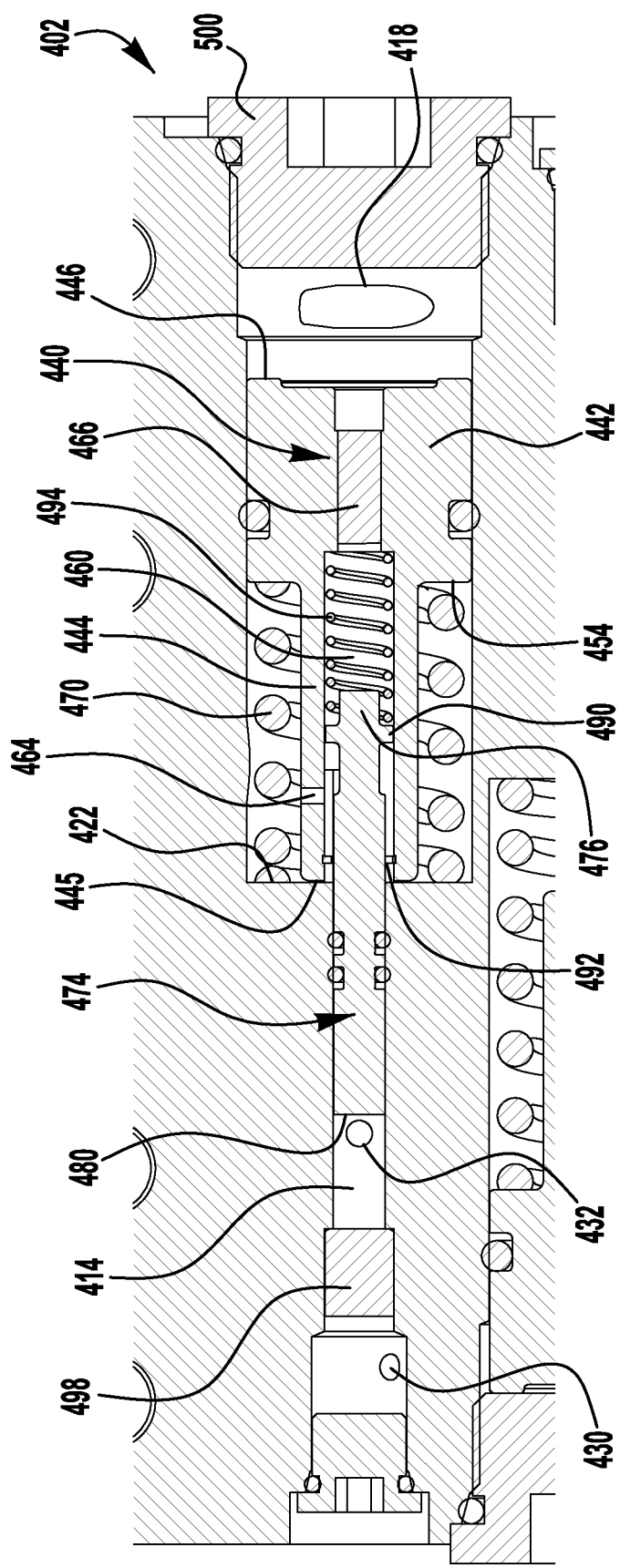
FIG. 7 is a partial cross-section view of the lubrication system of FIG. 3 taken along the 4-4 line showing a lubricant pump in a third state.

Referring to FIG. 6, when pressurized fluid is supplied to the first end 416 of the drive fluid chamber 412, the pressure acts on the end face 446 of the first movable member 440. When the pressure force acting on the end face 446 exceeds the biasing force of the biasing member 470, the first movable member 440 moves to a second position within the drive fluid chamber 412. In the second position, the second end 445 of the stem portion 444 is driven into abutment with the shoulder 422 and the biasing member 470 is compressed.

Since the second movable member 474 is movable relative to the first movable member 440, whether the second movable member 474 moves to a second position within the lubricant chamber 414, as shown in FIG. 6, is dependent on the lubricant pressure downstream of the second movable member 474 (i.e., the lubricant pressure force that acts on the end face of the second movable member 474 opposing movement of the second movable member 474 within the lubricant chamber 414). Specifically, if the lubricant pressure force acting on the end face 480 of the second movable member 474 opposing movement of the second movable member 474 within the lubricant chamber 414 is less than the biasing force of the biasing member 494 acting on the first end 476 of the second movable member 474, the second movable member 474 will move to the second position within the lubricant chamber 414 in response to movement of the first movable member 440 to the second position in the drive fluid chamber 412.

In the second position, the second movable member 474 is in an extended positioned within the lubricant chamber 414 such that the end face 480 of the second movable member 474 is adjacent the check valve 498. When the second movable member 474 moves from the first position to the second position, the end face 480 of the second movable member 474 engages the lubricant in the lubricant chamber 414 and forces the lubricant through the check valve 498 and out of the lubricant outlet 430.

When the first movable member 440 is in the second position, the first movable member 440 is prevented from further extended movement by the engagement between the second end 445 of the stem portion 444 and the shoulder 422. As a result, as pressurized drive fluid continues to be directed to the drive fluid chamber 412 via the drive fluid inlet 418, the pressure in the first end 416 of the drive fluid chamber 412 rises, typically rapidly.

When pressure acting on the first face 446 of the first movable member 440 exceeds a first pressure threshold, the reversing valve 466 will open. When the reversing valve 466 opens, drive fluid will flow through, or past, the reversing valve 466 and into the passage 460. As previously indicated, the passage 460 is open to the drive fluid chamber 412 at a location between the lubricant chamber 414 and the head portion 442 of the first movable member 440. The drive fluid chamber 412 at this location is fluidly connected to the dump passage (not shown). Thus, when the reversing valve 466 opens, drive fluid is diverted back to the drive fluid source 142.

As a result of dumping drive fluid back to the drive fluid source, the pressure acting on the first face 446 of the first movable member 440 drops below the biasing force of the biasing member 470 and the biasing member 470 moves the first movable member 440 back to the first position, as shown in FIG. 4.

When the first movable member 440 moves back to the first position in the drive fluid chamber 412, the first movable member 440 pulls the second movable member 474 back to its first position within the lubricant chamber 414. In particular, the stop 492 near the second end 445 of the stem portion 444 engages the flange 490 on the first end 476 of the second movable member 474 as the first movable member 440 moves to the first position within the drive fluid chamber 412 to pull the second movable member 474 to its first position within the lubricant chamber 414.

As indicated earlier, movement of the second movable member 474 from the second position to the first position within the lubricant chamber 414 creates a suction force that may pull lubricant into the lubricant chamber 414 via the lubricant inlet 432.

As the pressure on the end face 446 of the first movable member 440 continues to drop, the pressure will fall below a second pressure threshold resulting in the reversing valve 466 closing. With the reversing valve 466 closed and the first movable member 440 back in the first position, one stroke of the first lubricant supply pump 402 is completed and the cycle can repeat itself.

In this way, the first lubricant supply pump 402 and the second lubricant supply pump 404 will continually, and automatically, pump in response to pressurized drive fluid. Thus, the lubricant supply pumps 402, 404 need only be connected to the same pressurized drive fluid used to actuate the power cell 116 in order to operate.

Figure 8:
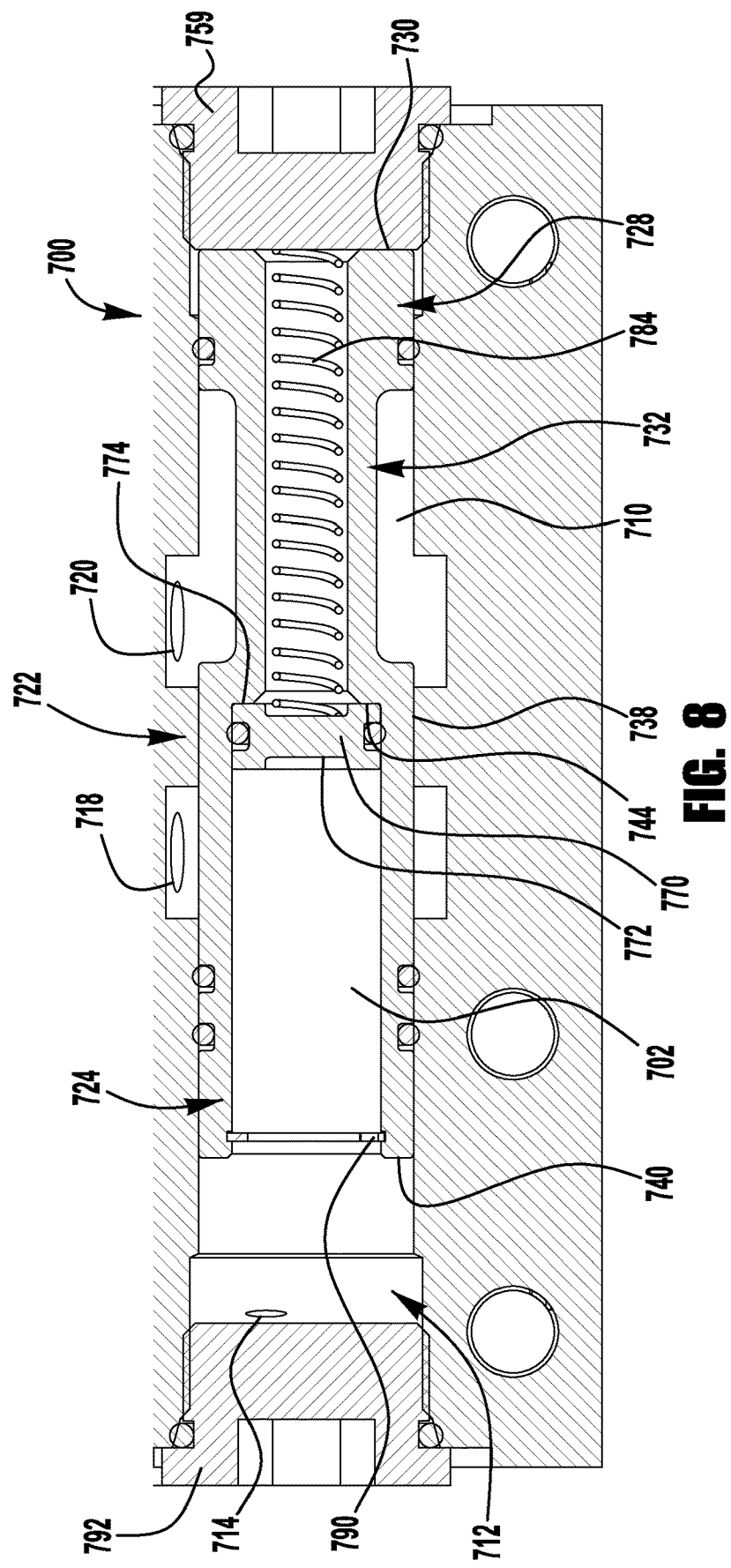
FIG. 8 is a partial cross-section view of the lubrication system of FIG. 3 taken along the 5-5 line showing the detune assembly in a second state.

As indicated earlier, the second movable member 474 is movable relative to the first movable member 440, depending on the lubricant pressure force acting on the end face 480 of the second movable member 474. Referring to FIG. 8, when the lubricant pressure force acting on the end face 480 of the second movable member 474 exceeds the biasing force applied to the second movable member 474 by the biasing member 494 located in the chamber 460, the second movable member 474 will move to a second position within the chamber 460 by compressing the biasing member 494. The second position may be any position in which the first end 476 of the second movable member 474 is retracted into the chamber 460 toward the head portion 442 of the first movable member. In other words, any position in which the flange 490 disengages from the stop 492.

The second position of the second movable member 474 within the chamber 460 may continually change during operation of the pump in response to the lubricant pressure force acting on the end face 480 of the second movable member 474 balancing out with the force applied by the biasing member 494. Thus, the stroke of the second movable member 474 may continuously change to maintain the output pressure, thereby making the pump a variable displacement pump.

Referring to FIG. 5, the lubricant main pump 600 may be fluidly coupled to the first and second lubricant supply pumps 402, 404 via the lubricant inlet 632 and may be fluidly coupled to pressurized drive fluid from the drive fluid source 142 via a drive fluid inlet (not shown) similar to the drive fluid inlet 418 of the first lubricant supply pump 402. Likewise, the detune assembly 700 and the lubricant reserve reservoir 702 may be fluidly coupled to one or both of the first and second lubricant supply pumps 402, 404 via the lubricant inlet 714 (FIG. 8) and the detune assembly 700 may be fluidly coupled to pressurized drive fluid from the drive fluid source 142 via the drive fluid inlet 720.

In the exemplary embodiment, other than the lubricant main pump 600 receiving lubricant from the first and second lubricant supply pumps 402, 404 and the check valve 698 having a higher cracking pressure than the check valve 498, the first lubricant supply pump 402 and lubricant main pump 600 operate substantially the same. Thus, the description of the operation of the first lubricant supply pump 402 applies equally to the lubricant main pump 600.

FIG. 5 illustrates the movable member 722 in a first position within the internal channel 710 and the follower 770 in a first position within the lubricant reserve reservoir 702. In the first position within the lubricant reserve reservoir 702, the follower 770 is biased by the biasing member 784 against the stop 790 (FIG. 8) at the inlet 742 of the lubricant reserve reservoir 702.

In the first position within the internal channel 710, the movable member 722 is biased by the biasing member 784, via the follower 770 engaging the stop 790, to a position in which the peripheral shoulder 740 of the movable member 722 is abutting the second plug 792. The positions of the follower 770 and movable member 722 in FIG. 5 represent the state in which system lubricant pressure is low and the lubricant reserve reservoir 702 is empty, which will be discussed further below.

Referring to FIG. 8, when pressurized lubricant is supplied to the lubricant inlet 714 from one or more of the lubricant supply pumps 402, 404, the lubricant pressure acts on the first face 772 of the follower 770 to move the follower 770 toward a second position within the lubricant reserve reservoir 702 against the bias of the biasing member 784. In particular, as lubricant pressure acts on the follower 770, the follower 770 moves toward the inner shoulder 744 of the lubricant reserve reservoir 702 and the lubricant reserve reservoir 702 begins filling with lubricant.

When the lubricant reserve reservoir 702 is full of lubricant, the second face 774 of the follower 770 abuts the inner shoulder 744. Further application of lubricant pressure pushes the movable member 722 to a second position within the internal channel 710. In the second position, the second end 730 of the movable member 722 engages the first plug 759 to prevent further movement of the movable member 722 away from the lubricant inlet 714.

When the movable member 722 is in the second position, the drive fluid inlet 720 is blocked from the drive fluid dump passage 718 by the first portion 724; thus, the hammer 110 is not being derated. FIG. 8, therefore, represents a state in which lubricant pressure in the lubrication system 200 is sufficient and an amount of lubricant is being held in reserve.

Figure 9:
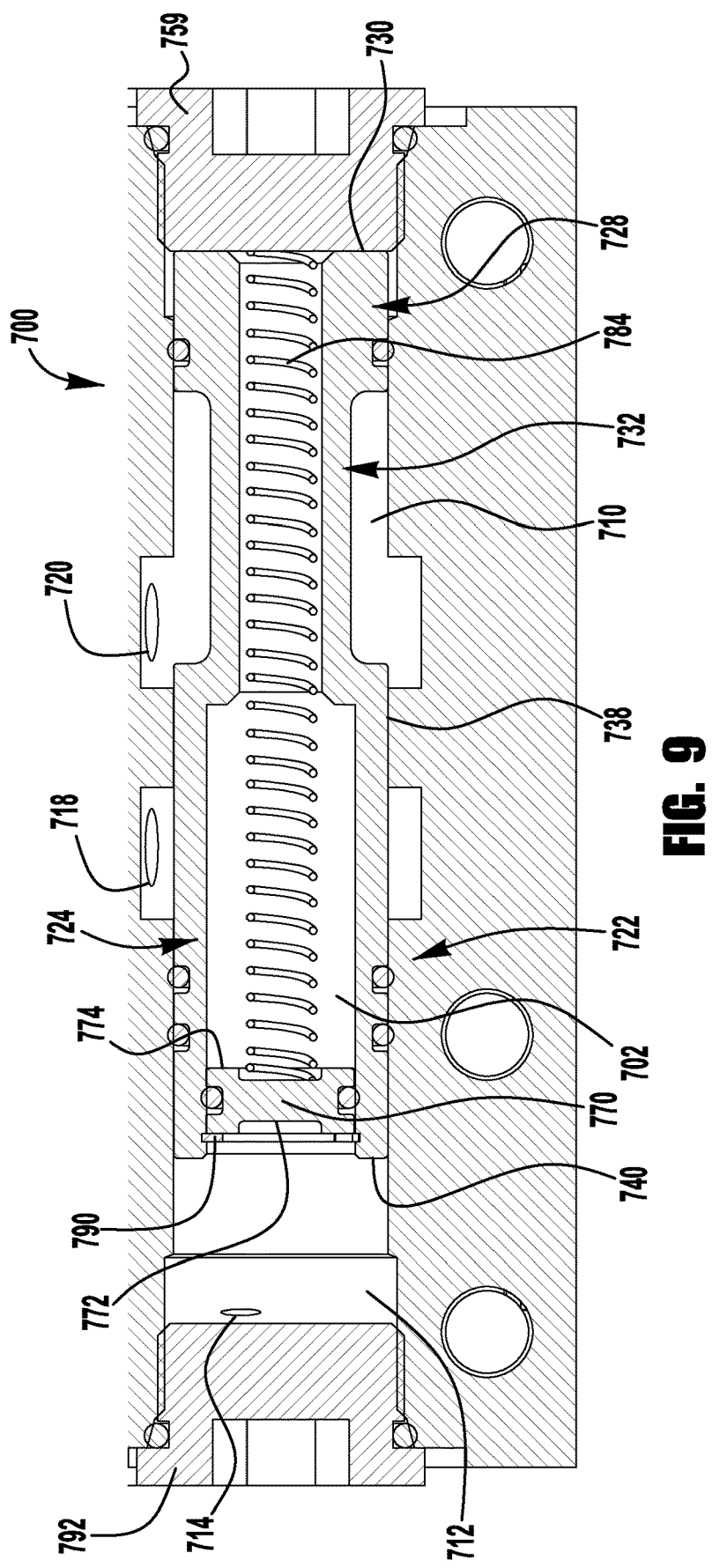
FIG. 9 is a partial cross-section view of the lubrication system of FIG. 3 taken along the 5-5 line showing the detune assembly in a third state.

Referring to FIG. 9, if the lubricant pressure in the lubrication system 200 falls below a specific pressure threshold (i.e., the biasing pressure force of the biasing member 784), the biasing member 784 will move the follower 770 from the second position within the lubricant reserve reservoir 702 toward the first position. Movement of the follower 770 from the second position to the first position forces lubricant from the lubricant reserve reservoir 702. The lubricant will flow through the lubricant inlet 714 and into a lubricant supply line (not shown) to the lubricant main pump 600. In this manner, if the lubricant pressure falls below acceptable levels, such as for example, if the lubricant reservoirs 212 run out of lubricant, the lubricant reserve reservoir 702 can supply lubricant to the power cell 116 in the interim until the lubricant reservoirs 212 can be replenished or replaced.

Once the follower 770 has moved to the first position, the lubricant in the lubricant reserve reservoir 702 has been emptied. In the first position, the biasing member 784 biases the follower 770 against the stop 790. As a result, the biasing member 784 moves the moveable member 722 to its first position within the internal channel 710. As shown in FIG. 5, in the first position, the drive fluid inlet 720 is in fluid communication with the drive fluid dump passage 718. Thus, in a state with low lubricant system pressure and no lubricant in the lubricant reserve reservoir 702, the drive fluid is diverted, at least partially, back to the drive fluid source 142 drive fluid dump passage 718 and the hammer 110 is derated.

The disclosed lubrication system 200 may provide numerous functions. In some embodiments, the lubrication system 200 provides lubricant pumps that, in response to pressurized drive fluid, will automatically pump lubricant to the power cell 116 without the use of expense, complicated lubrication systems using hydraulic motors that driving camshafts. In addition, in some embodiments of the lubrication system, the lubrication pumps may be variable displacement pumps that maintain a constant lubricant output pressure by continuously varying the stoke of the pump. Furthermore, in some embodiments, the lubrication system may store a reserve amount of lubricant, separate from replaceable lubricant cartridges or canisters, that will automatically be used when low lubricant system pressure is indicated. Still further, in some embodiments, the lubrication system may include a detune assembly that, when low lubricant system pressure is indicated, will is disabled, derated or detuned the work tool.

While the disclosed embodiments have been illustrated and described in detail in the drawings and foregoing description, such illustration and description is to be considered as exemplary and not restrictive in character, it being understood that only certain exemplary embodiments have been shown and described and that all changes and modifications that come within the scope of the disclosure are desired to be protected.

The disclosed embodiments are not limited to use with demolition hammers. Rather, they may be used with any work tool powered by a drive fluid where lubrication of surfaces of the work tool is desired. In addition, other configurations of the lubrication pumps, detune assembly and lubricant reserve reservoir are possible.

It will be apparent to those skilled in the art that various modifications and variations can be made to the disclosed dosing system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A lubrication system for a work tool powered by a drive fluid, the lubrication system comprising:
   a housing defining a drive fluid chamber and a lubricant chamber;
   a first movable member positioned within the drive fluid chamber and movable from a first position to a second position within the drive fluid chamber in response to drive fluid pressure acting on the first movable member;
   a second movable member at least partly positioned within the lubricant chamber, the second movable member operatively coupled to the first movable member and movable between a first position and a second position within the lubricant chamber;
   a biasing member positioned within the drive fluid chamber, the biasing member biasing the first movable member toward the first position; and
   a relief valve associated with the first movable member, the relief valve having an open state and a closed state; wherein in the open state, the drive fluid pressure acting on the first movable member is reduced such that the biasing member moves the first movable member to the first position within the drive fluid chamber.

2. The lubrication system of claim 1, wherein the relief valve switches to the open state when the drive fluid pressure acting on the first movable member is higher than a first pressure threshold and switches to the closed state when the drive fluid pressure acting on the first movable member is less than a second pressure threshold.

3. The lubrication system of claim 2, wherein the first pressure threshold is greater than the second pressure threshold.

4. The lubrication system of claim 1, the first movable member includes an internal passage and the relief valve is positioned within the internal passage.

5. The lubrication system of claim 4, wherein a drive fluid reservoir is associated with the work tool, and wherein the internal passage is in fluid communication with the drive fluid reservoir.

6. The lubrication system of claim 1, wherein a drive fluid reservoir is associated with the work tool, and wherein when the relief valve is in the open state, drive fluid in the drive fluid chamber is directed back to the drive fluid reservoir.

7. The lubrication system of claim 1, where the second movable member is axially movable relative to the first movable member.

8. The lubrication system of claim 7, wherein the first movable member includes an internal passage and at least a portion of the second movable member is received within the internal passage and movable between a first position and a second position within the internal passage.

9. The lubrication system of claim 8, further comprising a biasing member in the internal passage biasing the second movable member to an extended position relative to the first movable member.

10. The lubrication system of claim 1 further comprising an internal channel and a third movable member positioned within the internal channel, the third movable member movable by lubricant pressure from a first position to a second position, wherein in the first position, drive fluid is directed back to the drive fluid reservoir to derate the work tool.

11. The lubrication system of claim 10 wherein the third movable member further comprises:
   an internal chamber configured to store a reserve volume of lubricant; and
   a follower positioned within the internal chamber,
   wherein the follower is movable, by lubricant pressure, from a first position to a second position within the internal chamber, and
   wherein the follower is movable by a biasing member positioned within the internal channel from the second position to the first position.

12. The lubrication system of claim 11, wherein the third movable member is movable by the biasing member from the second position to the first position.

13. A demolition hammer powered by a drive fluid, comprising:
   a housing;
   a piston disposed within the housing;
   a tool disposed within the housing to be acted upon by the piston;
   a lubrication system, comprising:
      a housing defining a drive fluid chamber and a lubricant chamber;
      a first movable member positioned within the drive fluid chamber and movable from a first position to a second position within the drive fluid chamber in response to drive fluid pressure acting on the first movable member;
      a second movable member at least partly positioned within the lubricant chamber, the second movable member operatively coupled to the first movable member and movable between a first position and a second position within the lubricant chamber;
      a biasing member positioned within the drive fluid chamber, the biasing member biasing the first movable member toward the first position; and
      a relief valve associated with the first movable member, the relief valve having an open state and a closed state; wherein in the open state, the drive fluid pressure acting on the first movable member is reduced such that the biasing member moves the first movable member to the first position within the drive fluid chamber.

14. The demolition hammer of claim 13, wherein the relief valve switches to the open state when the drive fluid pressure acting on the first movable member is higher than a first pressure threshold and switches to the closed state when the drive fluid pressure acting on the first movable member is less than a second pressure threshold, where the first pressure threshold is greater than the second pressure threshold.

15. The demolition hammer of claim 13, wherein the first movable member includes an internal passage and at least a portion of the second movable member is received within the internal passage and movable between a first position and a second position within the internal passage against the bias of a biasing member.

* * * * *